United States Patent
Zheng et al.

(10) Patent No.: US 7,499,547 B2
(45) Date of Patent: Mar. 3, 2009

(54) SECURITY AUTHENTICATION AND KEY MANAGEMENT WITHIN AN INFRASTRUCTURE BASED WIRELESS MULTI-HOP NETWORK

(75) Inventors: Heyun Zheng, Debary, FL (US); Charles R. Barker, Jr., Orlando, FL (US); Amit Gandhi, Apopka, FL (US); Keith J. Goldberg, Casselberry, FL (US); Samer S. Hanna, Sanford, FL (US); Surong Zeng, Schaumburg, IL (US)

(73) Assignee: Motorola, Inc., Schaumburg, IL (US)

( * ) Notice: Subject to any disclaimer, the term of this patent is extended or adjusted under 35 U.S.C. 154(b) by 114 days.

(21) Appl. No.: 11/470,887

(22) Filed: Sep. 7, 2006

(65) Prior Publication Data

US 2008/0065888 A1 Mar. 13, 2008

(51) Int. Cl.
    *H04L 9/14* (2006.01)
(52) U.S. Cl. .................. 380/247; 380/277; 380/270; 713/171
(58) Field of Classification Search .................. 713/171; 370/331, 338; 455/436; 380/247, 270, 277
    See application file for complete search history.

(56) References Cited

U.S. PATENT DOCUMENTS

2002/0058502 A1* 5/2002 Stanforth .................... 455/422
2004/0076300 A1* 4/2004 Ishidoshiro ................. 380/277
2004/0103282 A1* 5/2004 Meier et al. ................. 713/171
2004/0240412 A1* 12/2004 Winget ....................... 370/331
2006/0126845 A1* 6/2006 Zheng ........................ 380/270
2007/0153739 A1* 7/2007 Zheng ........................ 370/331
2008/0062984 A1* 3/2008 Emeott et al. ............... 370/392

OTHER PUBLICATIONS

Zhao et al., "Security authentication of 3G-WLAN interworking"; 20th International Conference on Advanced Information Networking and Applications, 2006. AINA 2006. vol. 2, Apr. 18-20, 2006 p. 5 pp.*

* cited by examiner

*Primary Examiner*—Gilberto Barron, Jr.
*Assistant Examiner*—Hadi Armouche
(74) *Attorney, Agent, or Firm*—Randi L. Karpinia

(57) ABSTRACT

A system and method of security authentication and key management scheme in a multi-hop wireless network is provided herein with a hop-by-hop security model. The scheme adapts the 802.11r key hierarchy into the meshed AP network. In this approach, a top key holder (R0KH) derives and holds the top Pairwise Master Key (PMK_0) for each supplicant wireless device after the authentication process. All authenticator AP take the level one key holder (R1KH) role and receive the next level Pairwise Master Key (PMK_1) from R0KH. The link level data protection key is derived from PMK_1 via the 802.11i 4-way handshaking.

6 Claims, 5 Drawing Sheets

SECURITY AUTHENTICATION AND KEY MANAGEMENT WITHIN AN INFRASTRUCTURE BASED WIRELESS MULTI-HOP NETWORK

FIELD OF THE INVENTION

The present invention relates generally to wireless communications and more particularly to security authentication and key management within an infrastructure-based wireless multi-hop network.

BACKGROUND

An infrastructure-based wireless network typically includes a communication network with fixed and wired gateways. Many infrastructure-based wireless networks employ a mobile unit or host which communicates with a fixed base station that is coupled to a wired network. The mobile unit can move geographically while it is communicating over a wireless link to the base station. When the mobile unit moves out of range of one base station, it may connect or "handover" to a new base station and starts communicating with the wired network through the new base station.

In comparison to infrastructure-based wireless networks, such as cellular networks or satellite networks, ad hoc networks are self-forming networks which can operate in the absence of any fixed infrastructure, and in some cases the ad hoc network is formed entirely of mobile nodes. An ad hoc network typically includes a number of geographically-distributed, potentially mobile units, sometimes referred to as "nodes," which are wirelessly connected to each other by one or more links (e.g., radio frequency communication channels). The nodes can communicate with each other over a wireless media without the support of an infrastructure-based or wired network.

As wireless communications networks become more prevalent, security continues to be a major concern to both communication network providers and end users. This is most evident when using a mobile wireless network where the security environment can offer the greatest challenges since data may be readily received and manipulated by many nodes. The radio links used in a wireless network expose the signaling and data traversing the network to eavesdroppers and/or would-be hackers. In a multi-hop wireless network, this requires each link in the meshed devices to have a unique security association established through the multi-hop authentication and key management process. Then, the air frames on the link can be protected with the established security associations.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
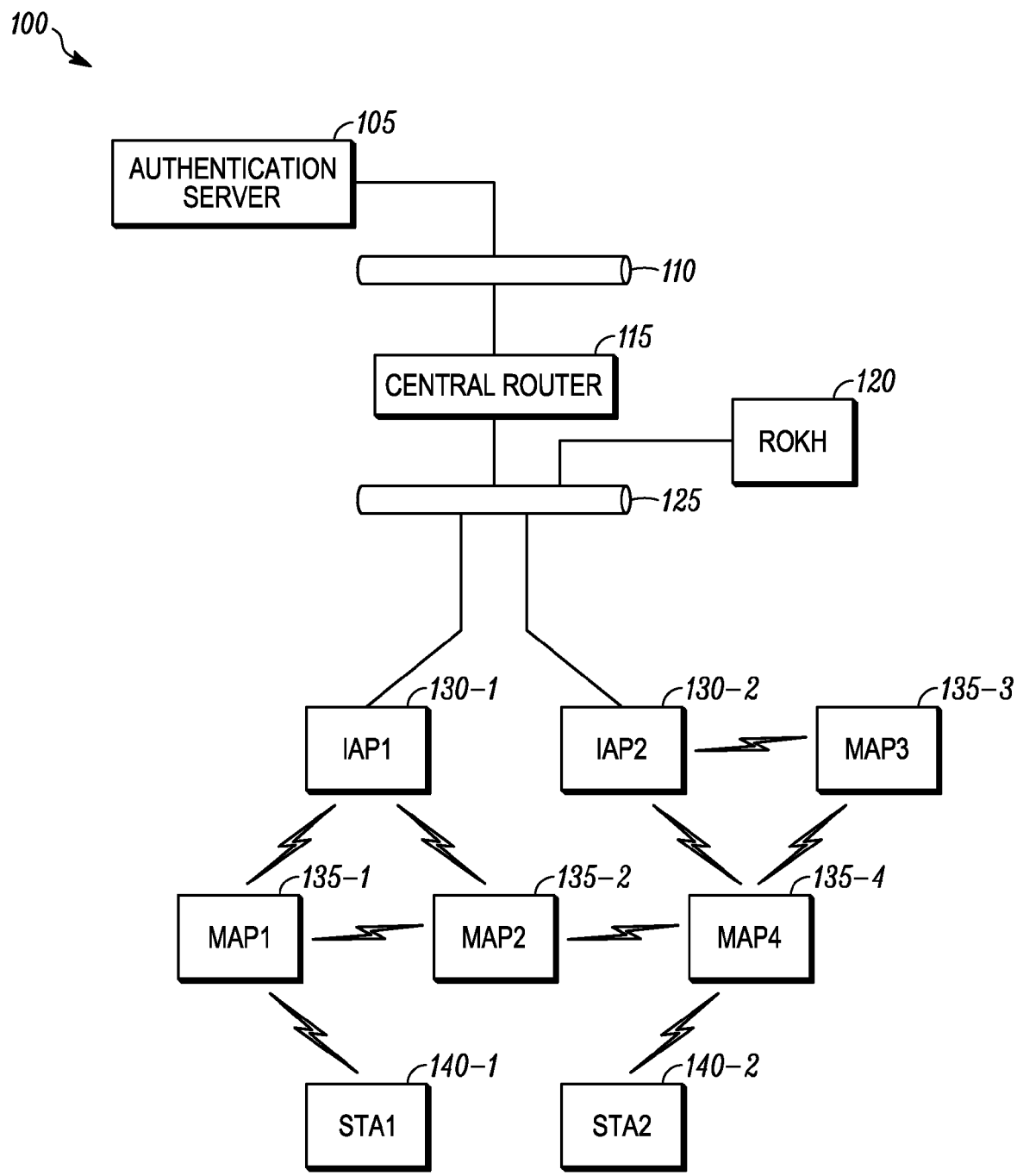
FIG. 1 illustrates an exemplary infrastructure-based multi-hop wireless network in accordance with some embodiments of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to security authentication and key management. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions of security authentication and key management described herein. The non-processor circuits may include, but are not limited to, a radio receiver, a radio transmitter, signal drivers, clock circuits, power source circuits, and user input devices. As such, these functions may be interpreted as steps of a method to perform security authentication and key management. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The present invention provides a security authentication and key management scheme for an infrastructure-based multi-hop wireless network with a hop-by-hop security model. The basic building blocks of the present invention are IEEE 802.11i and IEEE 802.1x. For the fast handoff features in 802.11r are included.

IEEE 802.1x is a new technology that provides almost unlimited scalability with minimal administration overhead. It also allows different authentication methods to be selected by the users or the operators. In the present invention, Tunneled Transport Layer Security (TTLS) is used for the user and device authentication due to its relative strong security and lower deployment cost. For the devices, Transport Layer Security (TLS) authentication is an optional feature.

For centralized authentication and 802.11r support, the top level key holder (R0KH) for the 802.11r key hierarch is designed to be located in the wired network. The message transportation between the top level (level zero) key holder and the level 2 key holders (R1KH) can be either in layer 2 or in the Internet Protocol (IP) layer.

In the present invention, a 802.11r based key hierarchy is adapted among the meshed access points which take the role of the level one key holders. The security management message flow among key holders is provided. The key management can support both 802.11i and 802.11r compliant wireless stations. It can also support virtual access points with possible multiple service set identifiers (SSID) deployed. The security message flow among level zero and level one key holders can be transported over layer 2 or layer 3 dependent upon the level zero key holder location. When all the level zero key holders are deployed in the same layer 2 segment with the level one key holders, the layer 2 communication transport can be used and otherwise the layer 3 communication transport shall be used. A Key Distribution Key (KDK) is derived during the initial authentication process and used to secure the key material transported from the top level key holder to the next level key holders. The role of level one key holder R1KH is authorized by the top level key holder based on the authorization information from the Authentication Server.

A system and method of security authentication and key management scheme in a multi-hop wireless network is provided herein with a hop-by-hop security model. The scheme adapts the 802.11r key hierarchy into the meshed access point (AP) network. In this approach, a top level key holder (R0KH) derives and holds the top Pairwise Master Key (PMK_0) for each supplicant wireless device after the authentication process. All authenticator access points (AP) take the level one key holder (R1KH) role and receive the next level Pairwise Master Key (PMK_1) from the top level key holder R0KH. The link level data protection key is derived from PMK_1 via a 4-way handshaking such as an 802.11i 4-way handshaking.

FIG. 1 illustrates an exemplary infrastructure-based multi-hop wireless network 100 in accordance with some embodiments of the present invention. In the exemplary network 100 of FIG. 1, level 2 communication channels among key holders are used and a top level key holder R0KH is attached to a central Ethernet switch. Thus the top level key holder R0KH is in the same L2 segment with all controlled intelligent access point (IAP) and mesh access point (MAP) devices. A remote authentications dial-in user service (RADIUS) client and 802.1X authenticator are also implemented within the network 100 in accordance with some embodiments of the present invention.

It will be appreciated by those of ordinary skill in the art that when the IP layer communication channels are used for the top level key holder R0KH and level one key holder R1KH, the R0KH can be located in any location. In accordance with an exemplary implementation, R0KH is located within the same host as the network management system. All R1KH devices connected to the same R0KH are identified through a Mobility Domain Identifier (MDI) which is advertised in all the beacon frames.

As illustrated, the network 100 includes one or more meshed access points 135-$n$ (MAP) which are used to route data packets from one or more intelligent access points 130-$n$ (IAP) to one or more wireless subscriber devices 140-$n$ (SD) (also referred to as stations (STA)). The one or more IAPs 130-$n$ then route the packets to a central Ethernet switch 125 communicatively coupled to a central router 115, and a top level key holder (R0KH) 120. The central router 115 is coupled via a wired backbone 110 to an authentication server 105. Although only the paths from subscriber devices (SD) to the wired network 125 are shown, it will be appreciated by those of ordinary skill in the art that meshed connections can be established as long as two neighboring devices such as subscriber device 140-1 and subscriber device 140-2 can communicate with one another.

The authentication server 105 works to provide authentication services to the R0KH 120 and will be described hereinafter. In general, the authentication server 105 performs the authentication function necessary to check the credentials of a supplicant on behalf of the authenticator and indicates whether the supplicant is authorized to access the authenticator's services. In one embodiment of the present invention, the authentication server 105 is located in the wired network section where physical security of the host can be provided. For example, the authentication server 105 can be an extensible authentication protocol—Tunneled Transport Layer Security/extensible authentication protocol—transport layer protocol (EAP-TTLS/EAP-TLS) enabled remote authentications dial-in user service (RADIUS) server for the centralized authentication.

As will be appreciate by those of ordinary skill in the art, the subscriber devices 140-$n$ in the network 100 may be required to send and receive encrypted data. Any device within the network 100 requiring/desiring access to the services offered by the authenticator's system is referred to as a supplicant. A device that authenticates another device (supplicant) which requires/desires to use the services protected by the authenticator is referred to as an authenticator. The authenticator enforces access control based on the authentication result.

As will be appreciated by those of ordinary skill in the art, each node in the network 100 (i.e. the IAPs 130-$n$, the MAPs 135-$n$, and the SDs 140-$n$) are authenticated to the network 100 before it joins the meshed network. The credentials for the authentication can be based on, for example, a password, a subscriber identity module (SIM) card identification (I.D.) or other I.D. which is unique to the particular node and is stored at the authentication server 105. Each node uses this relationship with the authentication server 105 to authenticate to a one-hop secured meshed MAP or IAP which has established a secure connection to the R0KH 120. The R0KH 120 will use the authentication services provided by the authentication server 105. The authentication server 105 also assists the particular node that is authenticating to establish a trust relationship with its neighbor nodes by distributing a session master key material that is encrypted to the R0KH 120. The R0KH 120 derives level zero and level one Pairwise Master Keys (PMK_0, PMK_1). The R0KH 120 also keeps PMK_0 and sends PMK_1 to the authenticator MAP or IAP which is taking the role of a level one key holder.

In one embodiment of the present invention, the network 100 incorporates IEEE 802.11r operability. 802.11r provides for fast BSS ("Basic Service Set") transitions. 802.11r thus facilitates connectivity aboard vehicles in motion, with fast handoffs from one base station to another managed in a seamless manner. The primary application currently envisioned for the 802.11r standard is VOIP ("voice over IP", or Internet-based telephony) via mobile phones designed to work with wireless Internet networks, instead of (or in addition to) standard cellular networks.

802.11r refines the transition process of a mobile client as it moves between access points. The protocol allows a wireless client to establish a security and quality of service (QoS) state at a new access point before making a transition, which leads to minimal connectivity loss and application disruption. The overall changes to the protocol do not introduce any new security vulnerabilities. This preserves the behavior of current stations and access points. 802.11r provides mechanisms for roaming mobile clients to communicate with candidate access points, establish security associations and reserve QoS resources.

In accordance with the present invention, within the network 100 of FIG. 1, a 802.11r based key hierarchy is applied to a meshed AP, thereby making fast handoff possible for one or more mobile APs. In this key hierarchy, a top level key PMK_0 is generated in the R0KH 120 from the master key material received from the authentication server 105. In the next level, a PMK_1 is derived in the R0KH 120 from the PMK_0. The PMK_1 is delivered to the R1KH. The pair-wise transient key (PTK) is derived from PMK_1 between the supplicant and the authenticator through a 802.11i 4-way handshaking. In accordance with some embodiments of the current invention, the top level key holder R0KH 120 is located in the wired network section and attached to the central Ethernet switch 125 and all other meshed access points (MAP) 135-*n* and the IAPs 130-*n* will take the level one key holder role.

In some deployments of the present invention, R0KH 120 can be contained within each IAP 130-*n*, thus all MAP 135-*n* associated with that IAP 130-*n* will be R1KH under that R0KH 120. (not shown) When the IP layer communication channels are used for the R0KH and R1KH, the R0KH and R1KH can be located in a different layer 2 segment.

EAPOL Proxy among Key Holders

An exemplary protocol used for communications between the nodes and the server 105 is EAP (Extensible Authentication Protocol). The EAP protocol defines a message format and exchange handshaking to support multiple authentication methods. EAP typically runs directly over data link layers such as Point to Point Protocol (PPP) or IEEE 802, without requiring IP. EAP provides its own support for duplicate elimination and retransmission, but is reliant on lower layer ordering guarantees. Fragmentation is not supported within EAP itself. However, individual EAP methods may support fragmentation such as EAP-TLS where long certificate data needs to be transmitted in several packages. For 802.1X, for example, EAP messages between the authentication supplicant and the R0KH 120 are encapsulated in EAPOL (EAP over local area network (LAN)) message formats. EAP is flexible and extensible in supporting multiple authentication mechanisms such as user password, certificate based authentication, one time password, authentication token or smart card, and the like. It provides a vehicle to negotiate and use appropriate authentication mechanisms including those which derive keying material at the node and the authentication server 105.

An authentication procedure begins when a node transmits an authentication request using, for example, an Extensible Authentication Protocol (EAP) comprising EAP Over Local Area Network (EAPOL) packets. The authentication process involves several EAPOL packets being transmitted and received, beginning with an EAP start packet and finishing with either an EAP success message packet or an EAP failure message packet. The authentication server stores the authentication credentials of a mobile device (typically called a Supplicant) that is being authenticated. Authentication servers also can be connected to other authentication servers to obtain Supplicant authentication credentials that are not stored locally.

When 802.11r key hierarch is used for the key management, the EAPOL messages for the authentication and key management have to be transported between the top level key holder R0KH and the next level key holder R1KH.

Figure 2:
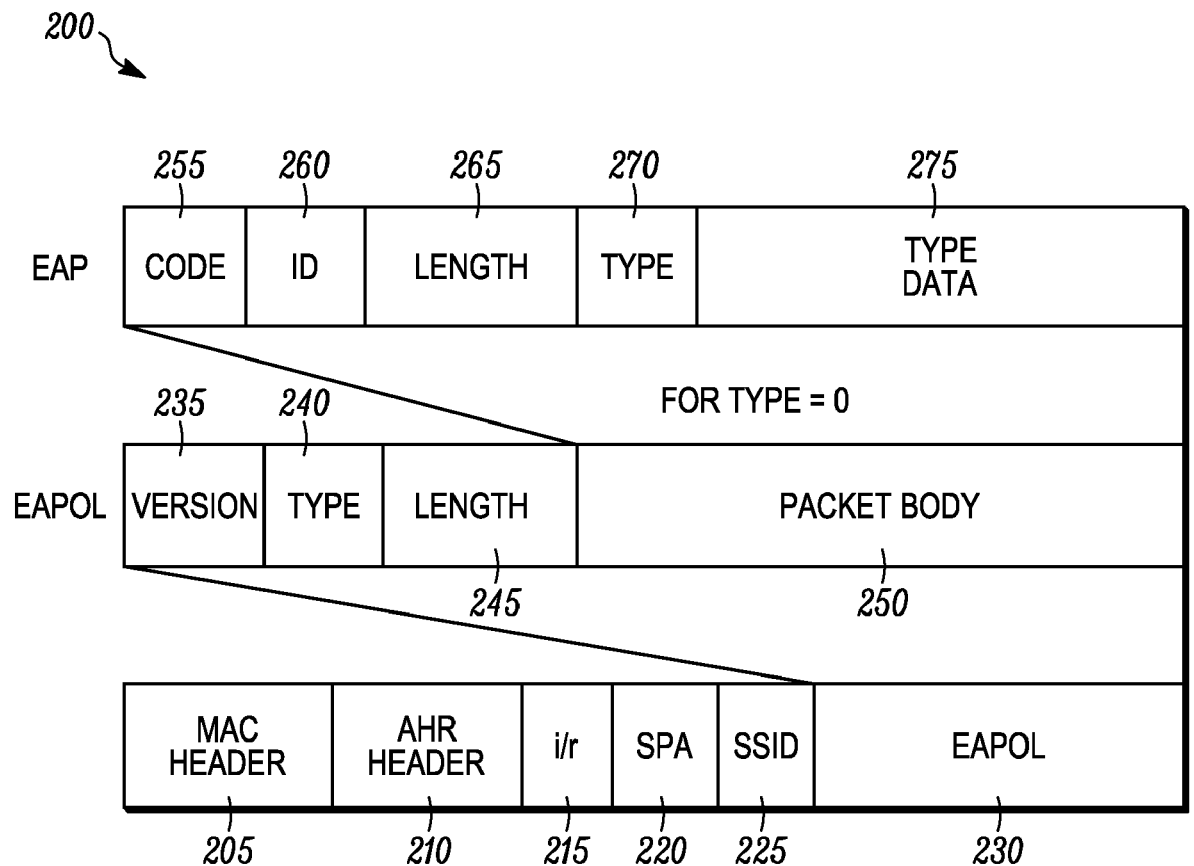
FIG. 2 illustrates an exemplary message format in accordance with some embodiments of the present invention.

FIG. 2 illustrates a message format 200 for use in the operation of some embodiments of the present invention. Specifically, FIG. 2 illustrates an EAP message encapsulation for a L2 key holder communication frame in accordance with some embodiments of the present invention. The Media Access Control (MAC) header 205 contains the source and destination MAC addresses of each hop. The Ad Hoc Routing (AHR) header 210 contains the source and destination MAC addresses of the authenticator and the meshed route ending device (i.e. R1KH and R0KH). A special protocol id is placed in the AHR header 210 protocol id field to represent the EAPOL proxy packet. A supplicant MAC address 220 is also included between the AHR header 210 and the EAPOL packet 230 within the message format 200. The message format 200 includes an i/r flag 215 in the first byte of the mesh payload body for supporting both 802.11i and 802.11r supplicants. The message format further includes a SSID information item 225 for supporting virtual APs. The supplicant MAC address 220 is needed for the R0KH 120 to know which supplicant device so as to be able to bind the PMK_0 and PMK_1 to that particular supplicant. When the i/r flag 215 indicates a 802.11i supplicant, the R0KH 120 derives the PMK based on the 802.11i standard and delivers the PMK to the R1KH. When the i/r flag 215 indicates a 802.11r supplicant, the R0KH 120 derives the PMK_0 and PMK_1 based on 802.11r key hierarchy and delivers the PMK_1 to the authenticator (R1KH). The SSID 225 is needed for the PMK_0 and PMK_1 derivation. For virtual APs, the supplicant can select one SSID from a number of available SSIDs.

In accordance with the present invention, when the messages among key holders are transported in the network layer, the EAPOL frame 230 along with i/r 215, SPA 220 and SSID 225 fields are placed in the (internet protocol) IP packet payload. Additionally, the sending key holder's MAC address is also included in the IP payload, which is needed for deriving PMK_1.

As is well known in the art, as illustrated in FIG. 2, the EAPOL frame 230 includes a protocol version 235 which is an unsigned binary number, which value is the version of the EAPOL protocol. The EAPOL frame 230 further includes a packet type 240 which is an unsigned binary number, which value determines the type of the packet as follows: a) EAP-packet; b) EAPOL-Start; c) EAPOL-Logoff; d)EAPOL-Key; e) EAPOL-Encapsulated-ASF-Alert. The EAPOL frame 230 further includes a packet body length 245 which is an unsigned binary, which value defines the length in octets of the packet body field. The EAPOL frame 230 also includes a packet body 250 which is presented if the packet type contains the value EAP-Packet, EAPOL-Key, otherwise, it is not presented.

As is well known in the art, as illustrated in FIG. 2, the EAP packet body 250 includes a code field 255 which identifies the type of EAP packet. EAP Codes are assigned as follows: 1=Request; 2=Response; 3=Success; 4=Failure. The EAP packet body 250 further includes an identifier field 260 which aids in matching responses with requests. The EAP packet body 250 further includes a length field 265 which indicates the length of the EAP packet including the Code 255, Identifier 260, Length 265 and Data fields 275. The EAP packet body 250 further includes a type field 270. The type field indicates the type of the request or response. This can be an identity type or a particular authentication method. The EAP packet body 250 also includes a type data field 275. The format of the data field 275 is determined by the Code field 255 and the type field 270.

Key Distribution Key and Role Authorization

As will be appreciated by those of ordinary skill in the art, there are two types of supplicant devices within the network 100. The two types of supplicant devices within the network 100 are the MAP devices 135-$n$ and the STA devices 140-$n$. In accordance with some embodiments of the present invention, the MAP devices 135-$n$ function as R1KH for the 802.11r key hierarchy. To protect the distribution of PMK_1 from the top key holder R0KH 120 to R1KH, a pair wise Key Distribution Key (KDK) is derived for each pair of R0KH and MAP/IAP as illustrated in FIG. 3.

Figure 3:
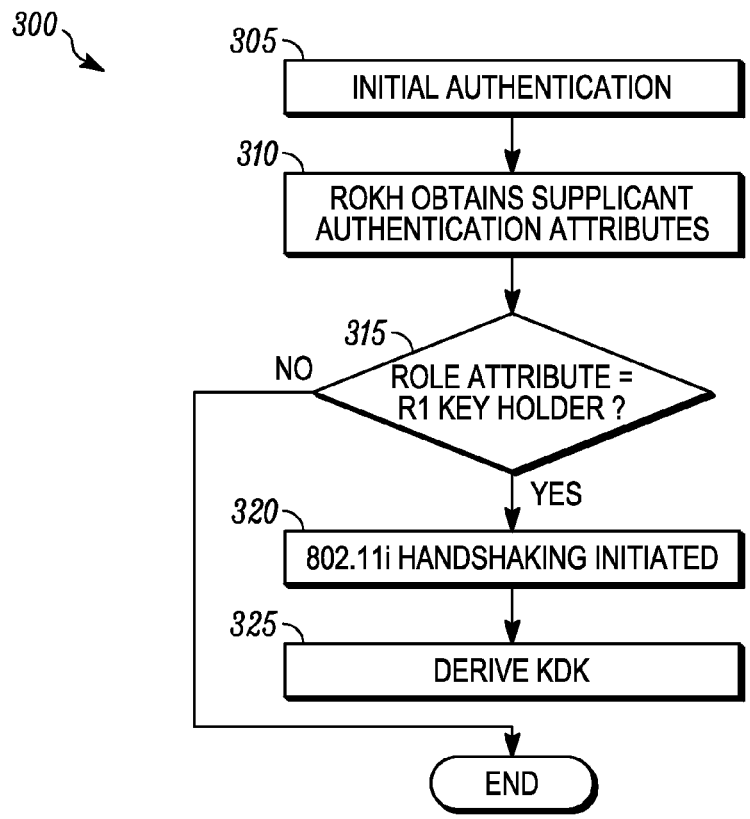
FIG. 3 is a flowchart illustrating a key distribution and role authorization process in accordance with some embodiments of the present invention.

FIG. 3 is a flowchart illustrating a key distribution and role authorization process 300 in accordance with some embodiments of the present invention. As illustrated in FIG. 3, the operation begins with an initial authentication step 305. The initial authentication, for example, can be an initial TTLS or TLS authentication. Next, in Step 310, the R0KH 120 obtains the authorization attributes from the authentication server 105 in the final "authentication success" message for the authenticated supplicant. Next, in Step 315, it is determined whether or not the authenticated supplicant role attribute is a level one key holder. When the authenticated supplicant role attribute is a level one key holder, the process continues to Step 320 in which the R0KH and the supplicant R1KH initiate a 802.11i style 4-way handshaking with PMK_0 to derive the KDK.

Next, in Step 320, the KDK is derived as:

KDK=KDF-KDKLen(PMK_0, "KDK Key derivation", SNonce||ANonce||AA||SPA).

Where:

KDF-256 is defined in 802.11r Section 8.5A.3.

SNonce is a random number generated by R1KH, and ANonce is a random number generated by R0KH.

the two random numbers are exchanged during the first two messages of the 4-way handshaking AA is the R0KH MAC address SPA is R1KH MAC address.

It will be appreciated by those of ordinary skill in the art that when a R1KH moves, the KDK stays the same unless the R0KH initiates a new KDK four way handshaking.

Authentication and Re-Authentication Initiation

Figure 4:
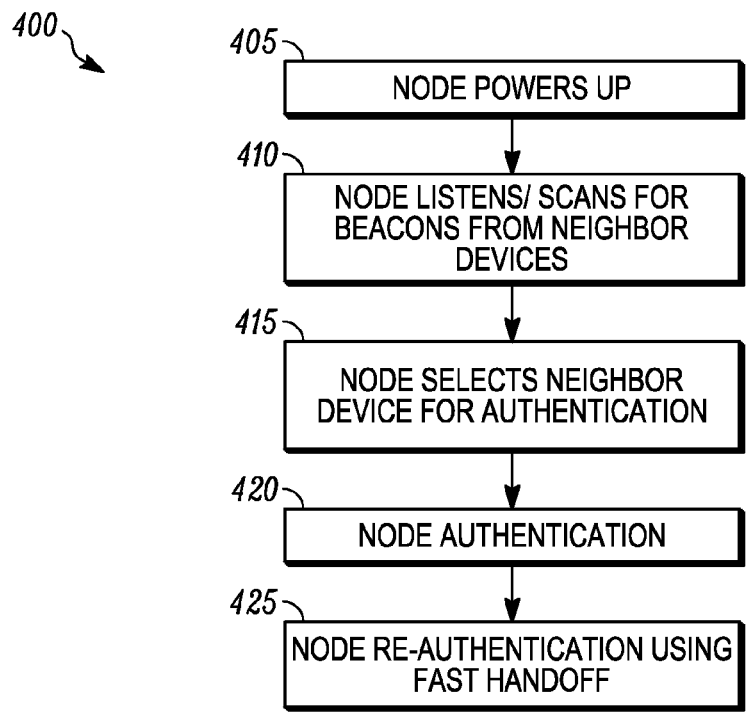
FIG. 4 illustrates an authentication procedure in accordance with some embodiments of the present invention.

FIG. 4 illustrates an authentication procedure 400 in accordance with some embodiments of the present invention. As illustrated in FIG. 4, the operation begins with a node 135-$n$ powering up in Step 405. Next, in Step 415, the node listens for/scans the beacon frames from its neighboring devices which can be either a MAP 135-$n$ or an IAP 130-$n$. Next, in Step 415, the node selects an IAP or a MAP to start the authentication process with by choosing a device that has indicated that it has a connection to an authentication server 105. Next, in Step 420 a first authentication is completed for the node with the selected neighboring MAP device. In Step 425, after the first authentication, the node can initiate re-authentication with other neighboring MAP devices which have been authenticated and connected to an IAP within the same mobility domain. This re-authentication uses 802.11r fast handoff process to avoid the full authentication transaction.

Authentication Message Flow

Figure 5:
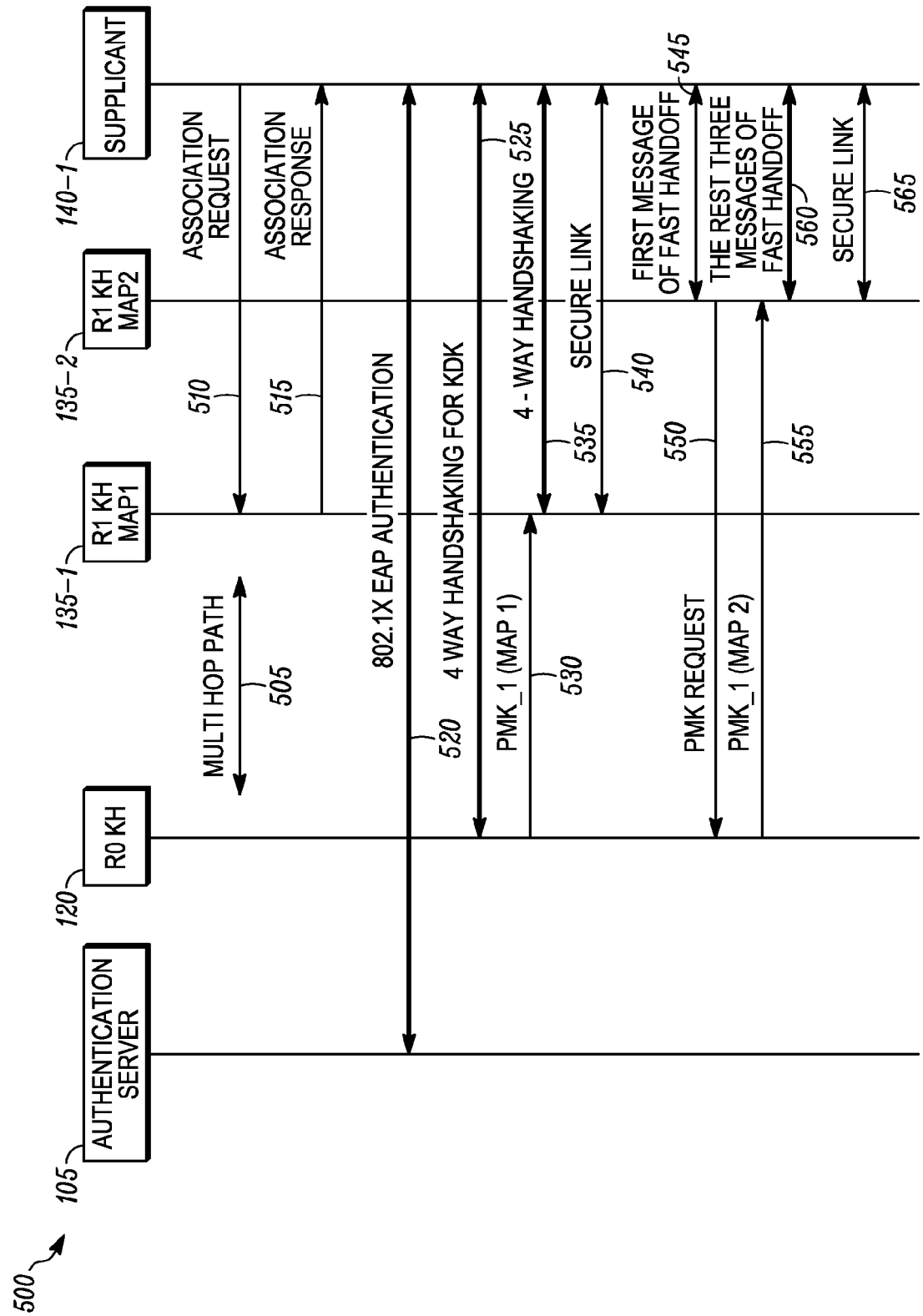
FIG. 5 is a message flow diagram illustrating authentication messages exchanged between various elements of the network of FIG. 1 in accordance with some embodiments of the present invention.

FIG. 5 is a message flow diagram 500 illustrating authentication messages exchanged between various elements of the network of FIG. 1 in accordance with some embodiments of the present invention. Specifically, FIG. 5 is a message flow diagram 500 illustrating authentication messages exchanged between a supplicant device and a R1KH MAP(or IAP). The R1KH MAP's 802.1x controlled port is unblocked for those messages from an un-authenticated device.

An R1KH MAP is a MAP or IAP device which has a secure connection to a R0KH; and is presumed already authenticated. It will take the R1KH role for the supplicant device.

In the exemplary scenario of the diagram 500 of FIG. 5, R1KH MAP1 135-1 and R1KH MAP2 135-2 are already authenticated and have a secure connection with R0KH 120. They may be, for example, a multi-hop away from R0KH 120 as illustrated by the multi hop path 505 of FIG. 5. The supplicant (i.e. device 140-1) in this exemplary scenario, has not been authenticated to both R1KH MAP1 135-1 and R1KH MAP2 135-2, which are the supplicant's one-hop neighbors.

In this exemplary scenario, the messages between R0KH 120 and the authentication server 105 are transported over User Datagram Protocol (UDP) based remote authentication dial-in user service (RADIUS) protocol. The messages are protected by using a RADIUS protocol security mechanism. Further, in this exemplary scenario, the authentication messages between R1KH 135-1 and R0KH 120 are transported over extensible authentication protocol over local area network (EAPOL) proxying mechanism and the key materials are protected with KDK between the R0KH and R1KH. R1KH 135-1 notifies R0KH 120 of the SSID selected by the supplicant 140-1 for virtual access point (AP) implementation.

As illustrated in FIG. 5, the authentication process starts when the supplicant 140-1 initiates an association request 510 to its neighboring MAP1 135-1. In response, the MAP1 135-1 sends an association response 515. For example, 802.1x authentication process will be started by the supplicant 140-1 (EAPOL-Start from the supplicant) if the 802.1X EAP authentication 520 is selected through the first two association messages. After a successful 802.1x EAP authentication, a MSK will be delivered from the authentication server 105 to R0KH 120 in the Access-Accept message together with EAP-Success packet and other authorization attributions. After getting MSK, R0KH 120 computes a PMK_0 and a PMK_1 as described in 802.11r standard.

To decide whether or not a KDK derivation process is to be conducted, R0KH 120 checks the supplicant's role from the authorization attributes returned from the backend authentication server 105. It the supplicant 140-1 has a R1KH role, the KDK derivation message exchange 525 is conducted. Otherwise, no KDK derivation process is started for the supplicant 140-1.

To generate the unique names for the PMK_0 and PMK_1, R0KH 120 generates a random number called ANonce to be used to derive the PMK_0 name and PMK_1 name. This ANonce is sent to MAP1 135-1 together with PMK_1 and PMK_1 name in message 530. The ANonce is be used by MAP1 135-1 in the 4-way handshaking with the supplicant 140-1. The supplicant 140-1 will then use the same ANonce to derive the same key names.

After receiving the PMK_1 530 from the R0KH 120, MAP1 initiates a 4-way handshaking 535 with the supplicant 140-1 to generate a PTK to protect the link between the supplicant 140-1 and MAP3 135-3 (not shown in FIG. 5). Thereafter, MAP1 135-1 and the supplicant 140-1 can communicate within a secure link 540.

Figure 6:
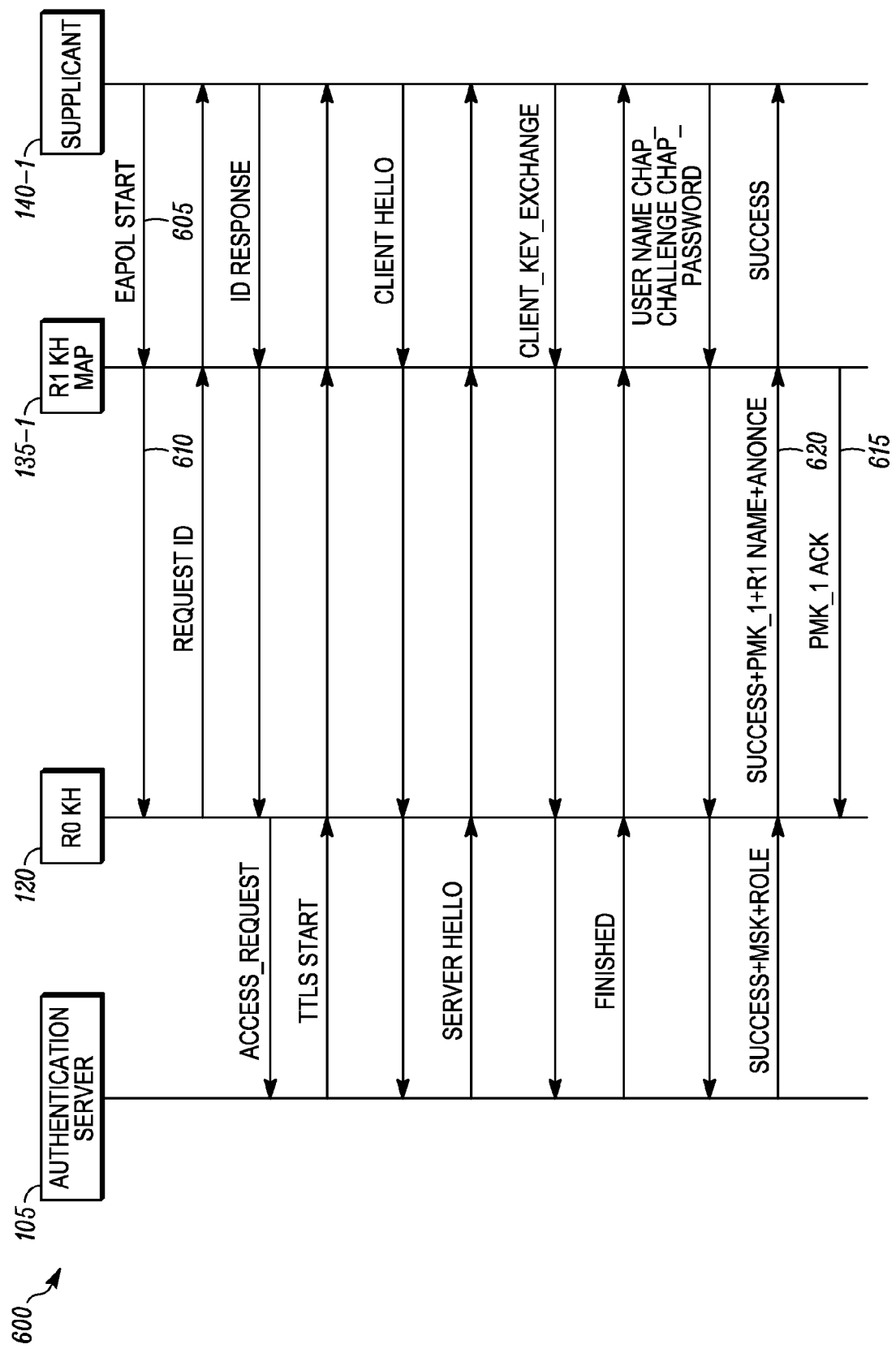
FIG. 6 illustrates more detail of the message exchange of FIG. 5 in accordance with some embodiments of the present invention.

FIG. 6 illustrates an exemplary detailed message exchange 600 as described previously herein in FIG. 5 when the 802.1x authentication is EAP-TTLS in accordance with some embodiments of the present invention. As illustrated in FIG. 6, supplicant 140-1 sends an EAPOL-start frame 605 to the R1KH MAP 135-1 when 802.1.x authentication is selected. R1KH 135-1 then transports this frame 610 to the R0KH 120. The R0KH 120 takes control of all the message flow between the supplicant 140-1 and the authentication server 105. The R1KH MAP 135-1 implements a retry state machine for EAPOL-Start to send to the R0KH 120. The last message PMK_1 ACK 615 completes the state machine in R0KH 120. The last message 620 from R0KH 120 to R1KH 135-1 contains both PMK_1, R1Name and Anonce. If the supplicant 140-1 is a 802.11i device, only 802.11i PMK is delivered to R1KH 135-1.

RE-Authentication (Fast Transition)

Referring back to FIG. 5, after the first authentication with MAP1 135-1, the supplicant 140-1 can initiate re-authentication (fast handoff) process with any neighboring MAP devices 135-n which have advertised a secure connection to an authentication server 105 and are in the same mobility domain. The re-authentication process follows 802.11r fast BSS transition: base mechanism over-the-air. The re-authentication request includes the R0Name, R1Name, SNonce and its associated top level key holder name R0KH-ID. R0Name and R1Name are also be included.

As illustrated in FIG. 5, after the authentication procedure is completed between the supplicant 140-1 and MAP1 135-1, the supplicant 140-1 initiates a re-authentication procedure with its next neighbor device R1KH MAP2 135-2. For example, a first message with fast handoff 545 is sent from the supplicant 140-1 to MAP2 135-2. In response, MAP2 135-2 sends a PMK request 550 to R0KH 120 requesting the corresponding PMK_1 from the R0KH 120 if it does not hold that PMK_1 identified by R1Name. The PMK_1 request to R0KH shall include the R0Name. In response, R0KH 120 sends PMK_1 555 to MAP2 135-2. Thereafter, the MAP2 135-2 sends the second message to the supplicant 140 when MAP2 135-2 gets the corresponding PMK_1. Supplicant 140-1 and MAP2 135-2 complete the fast handoff messages 560 and result in a secure link 565. It will be appreciated by those of ordinary skill in the art that this fast handoff re-authentication can be repeated for any number of MAP or IAP devices within communication range (in the neighborhood) of the supplicant.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. A method for communicating between a top level key holder and a level one key holder for security authentication and key management within an infrastructure-based wireless multi-hop network, comprising:

communicating a message having a message format comprising:
a Media Access Control (MAC) header containing a source and a destination MAC addresses of at least one hop;
an Ad Hoc Routing (AHR) header containing:
a source and a destination MAC addresses of the level one key holder and the top level key holder, and
a protocol identification representing an extensible authentication protocol over local area network (EAPOL) proxy packet;
a supplicant MAC address;
an i/r flag which is an indicator of 802.11i or 802.11r standard; and
a service set identifier (SSID).

2. A method as claimed in claim 1, wherein the supplicant MAC address identifies which supplicant device to bind a pair-wise master key_0 (PMK_0) and a PMK_1.

3. A method as claimed in claim 1, wherein the i/r flag indicating a 802.11i supplicant identifies that the PMK is derived based on a 802.11i standard and the PMK is to be delivered to a R1KH.

4. A method as claimed in claim 1, wherein the i/r flag indicating a 802.11r supplicant identifies that the PMK_0 and PMK_1 are derived based on a 802.11r key hierarchy and the PMK_1 is to be delivered to the authenticator.

5. A method as claimed in claim 1, wherein the SSID is used for PMK_0 and PMK_1 derivation for a virtual access point, and further wherein a supplicant selects an SSID from a plurality of available SSIDs.

6. A method as claimed in claim 1, wherein the message is transported on a communication layer selected from a group comprising a layer 2 and a layer 3, and further wherein when the message format is placed in the internet protocol (IP) packet payload, a R1KH MAC address is added into a message contents.

* * * * *